United States Patent [19]

Iwaki et al.

[11] Patent Number: 4,823,642
[45] Date of Patent: Apr. 25, 1989

[54] AIR-FUEL RATIO CONTROLLING APPARATUS OF AN ENGINE WITH AN AUTOMATIC CHANGE GEAR OF ELECTRONIC CONTROL TYPE

[75] Inventors: Masato Iwaki, Higashihiroshima; Ikuo Okamoto; Kenji Ushijima, both of Hiroshima; Hiroshi Kinoshita, Hiroshima, all of Japan

[73] Assignee: Mazda Motor Corporation, Hiroshima, Japan

[21] Appl. No.: 42,060

[22] Filed: Apr. 24, 1987

[30] Foreign Application Priority Data

Apr. 30, 1986 [JP] Japan .................... 61-100649

[51] Int. Cl.4 .............................. B60K 41/06
[52] U.S. Cl. ........................ 74/860; 74/863
[58] Field of Search ............. 74/860, 857, 862, 863, 74/865, 877

[56] References Cited

U.S. PATENT DOCUMENTS

| | | | |
|---|---|---|---|
| 3,727,486 | 4/1973 | Vulliamy | 74/860 |
| 3,741,042 | 6/1973 | Ravenel | 74/863 |
| 4,046,032 | 9/1977 | Braun et al. | 74/865 |
| 4,245,604 | 1/1981 | Lahiff | 74/860 X |
| 4,353,272 | 10/1982 | Schneider et al. | 74/860 X |
| 4,459,806 | 7/1984 | Falk | 74/857 X |
| 4,474,081 | 10/1984 | Kinugasa et al. | 74/865 X |
| 4,508,088 | 4/1985 | Hasegawa et al. | 74/860 X |
| 4,596,164 | 6/1986 | Hasegawa et al. | 74/860 |
| 4,598,611 | 7/1986 | Frank | 74/857 X |
| 4,620,420 | 11/1986 | Gloss et al. | 74/860 X |
| 4,693,225 | 9/1987 | Abe et al. | 74/866 X |

FOREIGN PATENT DOCUMENTS

| | | | |
|---|---|---|---|
| 3415596 | 4/1984 | Fed. Rep. of Germany | 74/857 |
| 180864 | 10/1983 | Japan | 74/863 |
| 134338 | 8/1984 | Japan | 74/860 |

*Primary Examiner*—Dwight G. Diehl
*Attorney, Agent, or Firm*—Burns, Doane, Swecker & Mathis

[57] ABSTRACT

An air-fuel ratio controlling apparatus of an engine having an electronic control type automatic change gear ensures the expected acceleration feeling when a power mode is selected in the low load operation with a view to the start or the like of the automobile, and ensures the operation with emphasis upon the fuel cost. An air-fuel ratio adjusting means is provided to correct the air-fuel ratio to be richer during the low load operation of the engine when the power mode is selected than when an economy mode is selected.

8 Claims, 4 Drawing Sheets

AIR-FUEL RATIO CONTROLLING APPARATUS OF AN ENGINE WITH AN AUTOMATIC CHANGE GEAR OF ELECTRONIC CONTROL TYPE

BACKGROUND OF THE INVENTION

The present inventio relates to the air-fuel ratio controlling operation of an engine having an automatic change gear of electronic control type.

Generally, the electronic control type automatic change gear, which is well known and is actually in general purpose use, may select when necessary a power mode where the speed change gear may be automatically controlled in accordance with a first shift pattern predetermined with emphasis on the engine output and an economy mode where the speed change gear may be automatically controlled.

As the improvement in the engine output performance and the improvement in the fuel cost performance are basically contradictory demands in terms of the fuel control, the two modes try to positively attach importance to one of these two demands and provide a correlation of the demand with respect to control of the fuel (air-fuel ratio).

In the arrangement disclosed in, for example, Japanese Patent Application Laid-Open publication Tokkaisho No. 59-134338, a fuel controlling system is proposed wherein the high load increment factor is adapted to be set larger when the power mode is selected than when the economy mode is selected. Also, for example, in Japanese Patent Application Laid-Open publication Tokkaisho No. 60-104742, a fuel controlling system is proposed wherein the high load increment region for the high load increment is adapted to be enlarged more when the power mode is selected than when the economy is selected.

Such a fuel controlling system is related to the adoption of a shift pattern wherein the power mode is adapted to be shifted up on the side of the higher speed, and the higher load at the high load operation of the engine. On the other hand, in the low speed and low load operation of the engine, the special difference does not exist between both the modes; that is, there is no special difference regardless of whether the power mode is selected or the economy mode is selected, and special consideration is not given to the fuel control.

Accordingly, if the power mode is selected through the expectation of the strong acceleration in, for example, the start of an automobile, the substantial difference does not exist between the two modes in the low speed and low load region, so that the expected acceleration feeling, and output feeling are not provided in the start.

Namely, as disclosed in the specifications of the domestic applications in Japanese Patent Application Laid-open publication Tokkaisho No. 59-134338, and Japanese Patent Application Laid-open publication Tokkaisho No. 60-104742, the conventional system is directed to the high load enrich. In the conventional system, even if the power-shift pattern is selected, the air-fuel ratio and output of the low load region remains unchanged with respect to the economy-shift pattern, so that the start acceleration performance with the power-shift pattern has no superiority over the economy-shift pattern.

Also, Japanese Patent Application Laid-open publication Tokkaisho No. 59-128976, and Japanese Patent Application Laid-open publication Tokkaisho No. 59-128977 are adapted to make the ignition time later, based on the consideration that knocking is likely to be caused when the power shift pattern is selected relative to when the economy shift pattern is selected, and have nothing to do with the art idea of this case. To delay the ignition time is to lower the engine output, and in the prior art, it is said that the start acceleration in the power-shift pattern is deteriorated.

SUMMARY OF THE INVENTION

Accordingly, an object of the present invention is to provide an air-fuel ratio controlling apparatus of an engine having an automatic change gear of the electronic control type, which may ensure the expected acceleration feeling when the power mode is selected in the low load operation with a view to the start or the like of the automobile, and which may ensure the operation with emphasis upon the fuel cost.

In accomplishing this object, according to the engine having an electronic control type automatic change gear, which is capable of selecting the power mode or the economy mode if necessary, there is provided an air-fuel ratio adjusting means which is adapted to correct the air-fuel ratio to become richer when the power mode is selected during the low load operation of the engine than when the economy mode is selected.

According to the present invention, the extremely good start acceleration performance is provided when the power mode is selected, such that a clear difference may be provided in the operation performance during the low load operation with respect to the economy mode having an emphasis upon the fuel cost, so that the low load operation may be performed in accordance with the intention of the driver.

Also, the air-fuel is made rich during the low load operation to improve the output of the low load operation. Furthermore, as the air-fuel changes in richness with the movement, i.e., start acceleration, from the low load to the high load, the start acceleration becomes better because of the superior output characteristics.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
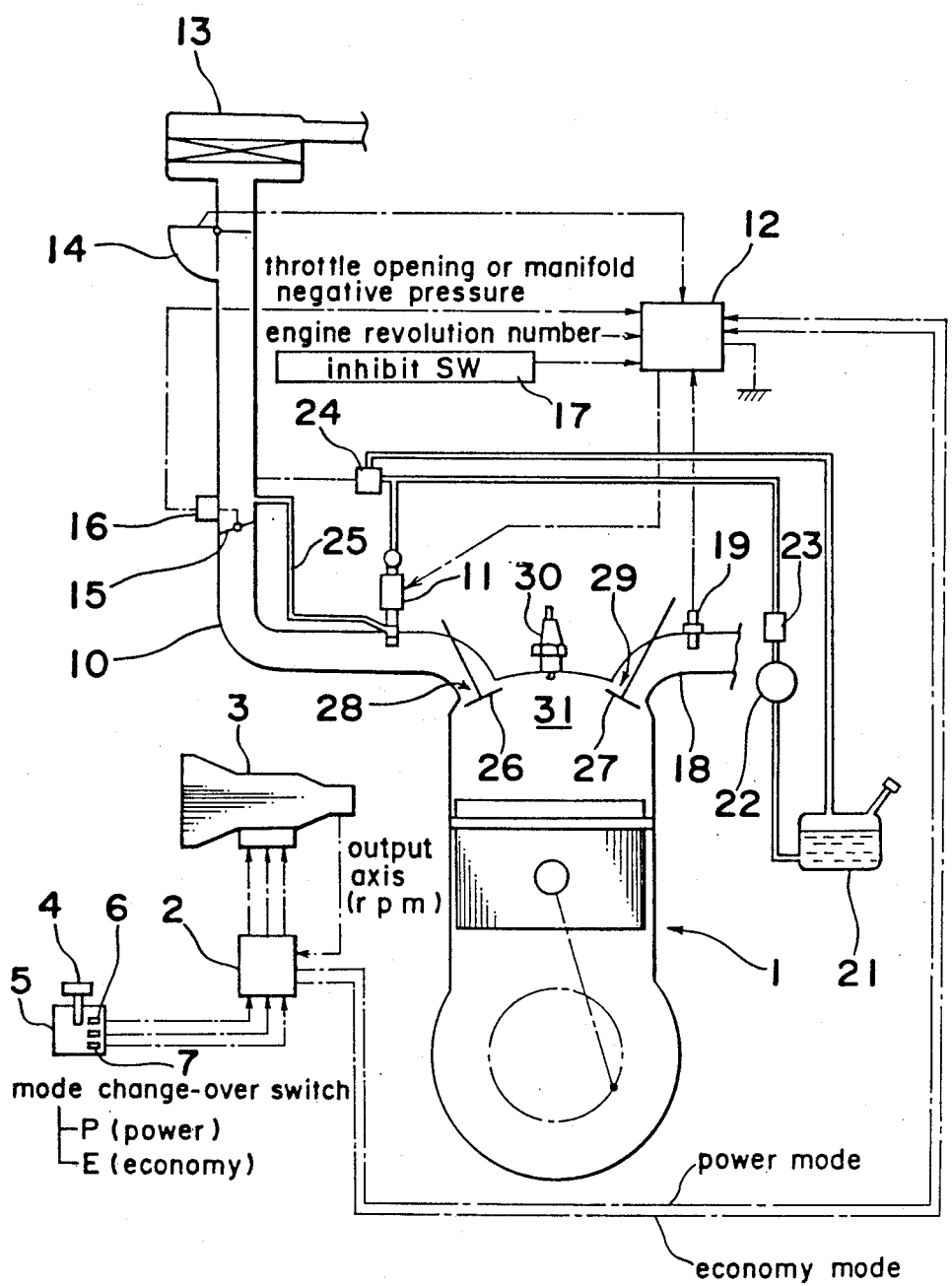
FIG. 1 is a schematic view for the purpose of illustrating a system construction of an air-fuel ratio controlling apparatus in accordance with the embodiment of the present invention.

Referring now to the drawings, there is shown an embodiment of the present invention as the air-fuel ratio controlling apparatus of an engine with an electronic control type automatic change gear.

As the system construction of the entire engine is shown in FIG. 1, an electronic control type of automatic speedchange gear 3 which is automatically controlled by an automatic change controlling circuit 2 is mounted on the engine 1, so that either a power mode or an economy mode is adapted to be selected (specified) by the mode change-over switches 6, 7 disposed on the panel 5 for operating the shift lever 4.

The above-described automatic change controlling circuit 2 stores a first shift pattern predetermined with emphasis on the engine output and a second shift pattern predetermined with emphasis on the fuel cost. When the power mode has been selected, the speed change controlling operation, i.e., shift up, or shift down, corresponding to the operation condition of the engine is effected in accordance with the first shift pattern. When the economy mode has been selected, the speed change controlling operation is effected in accordance with the second shift pattern.

Six kinds of control information as listed hereinbelow are inputted as electric signals into a fuel controlling circuit 12, which executes the controlling operation with respect to the injector 11 disposed downstream of an air-inlet passage 10.

Qa: Inlet air amount to be detected by an air flow meter 14 disposed in the air-inlet passage downstream of an air cleaner 13;

$TV\theta$: Throttle opening (which may be the air-inlet pipe negative pressure downstream of the throttle valve) to be detected by an opening sensor 16 disposed with respect to the throttle valve 15 of the air-inlet passage 10;

Ne: Engine revolution number to be detected by the rotation sensor disposed with respect to a crankshaft or the like, which is not concretely shown;

Range Signal: Signal concretely showing either N (neutral) range or D (drive) range, which is detected by an inhibit switch 17;

Mode Signal: Power-mode signal and economy-mode signal to be outputted from the automatic speed-change controlling circuit 2; and Air-fuel Ratio (A/F): Air-fuel ratio to be detected by a so-called $O_2$ sensor 19 disposed on the exhaust passage.

It is to be noted that the fuel of a fuel tank 21 is pressed by a fuel pump 22, so that it may be fed through a fuel filter 23 into the injector 11 as is well known. The pressure of the feed fuel is adapted to be adjusted by a pressure regulator 24. An air-assisting passage 25 which communicates, at its one end, with the air-inlet passage 10 disposed upstream of the throttle valve 15 communicates with the injection orifice of the injector 11, so that the injection fuel is adapted to be promoted to be gasified and vaporized.

Also, an inlet valve 26 and an exhaust valve 27 in FIG. 1 open and close, respectively, the inlet port 28 and the exhaust port 29 at the given time. An ignition plug 30 is provided on a combustion chamber 31.

Figure 2:
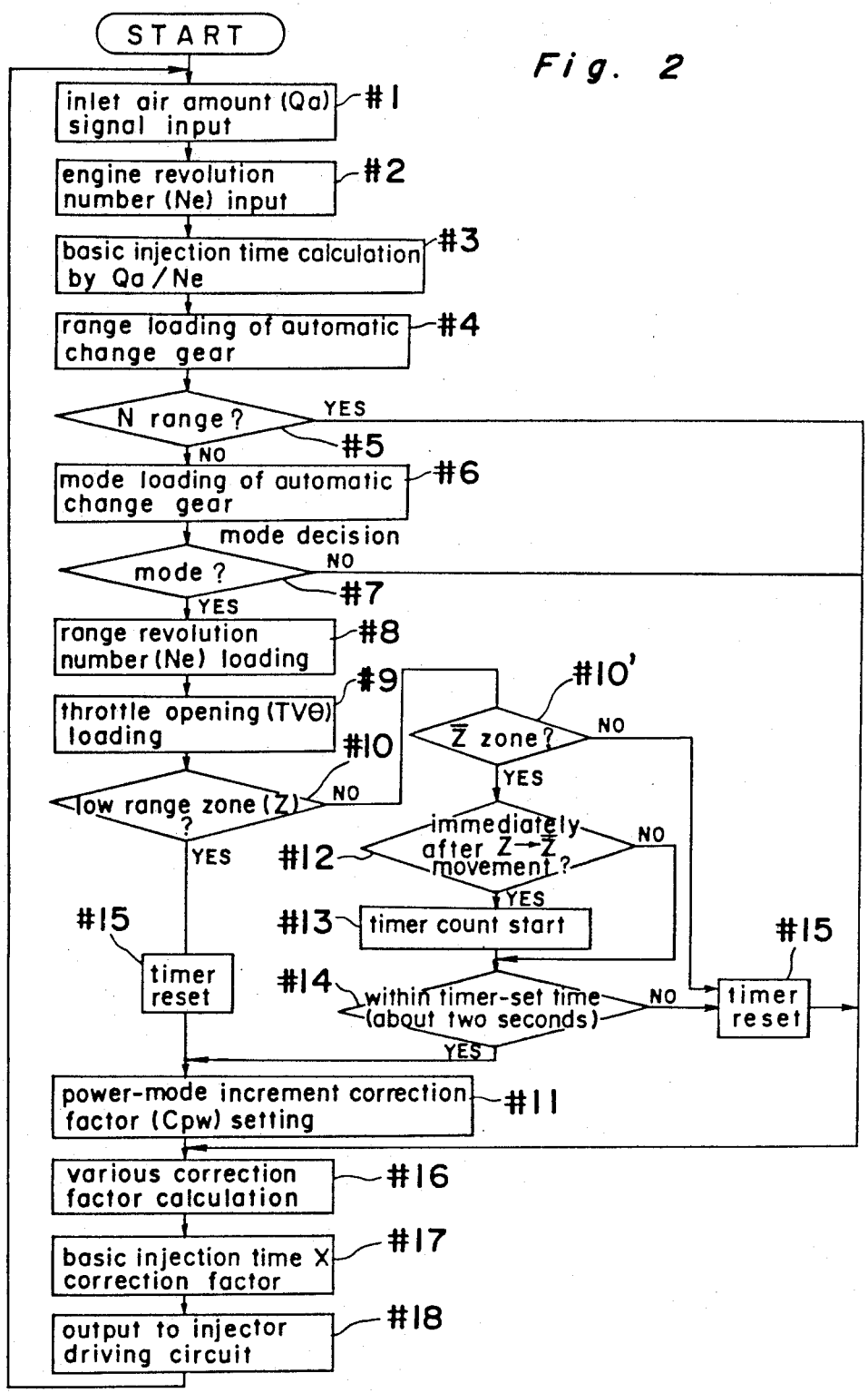
FIG. 2 is a flow-chart of the control program which the fuel controlling circuit provided in the apparatus of FIG. 1 executes.

The flow chart of the fuel controlling program to be executed by the fuel controlling circuit 12 is shown in FIG. 2. The fuel controlling system will be described in accordance with this flow chart.

When the controlling operation starts, the inlet air amount Qa and the engine revolution number Ne are respectively loaded at steps #1 and #2 to calculate the inlet air amount (Qa/Ne) per one revolution at step #3 and to calculate the basic injection time (equal to $K \times Qa/Ne$ ... wherein K is a predetermined constant) in accordance with the calculated value.

The range of the automatic speed-change gear 3 is loaded at the next step #4 to decide at step #5 whether or not the range is the N (neutral) range. When it is not the N range, i.e., is the D (drive) range, the mode of the automatic change gear is loaded at step #6. It is to be noted that the subsequent power-mode increment processing step is looped when the range is the N range. At step #7, the decision is made as to whether or not the loaded mode is the power mode. When the power mode has been selected, the engine revolution number Ne is loaded at step #8. It is to be noted that the subsequent power-mode increment processing step is looped when the economy mode has been selected.

Then, at step #9, the throttle opening $TV\theta$ is loaded. At step #10 the decision is made, from the engine revolution number Ne and the throttle opening $TV\theta$, as to whether or not the zone is the low load zone Z wherein the power-mode increment should be performed.

Figure 3:
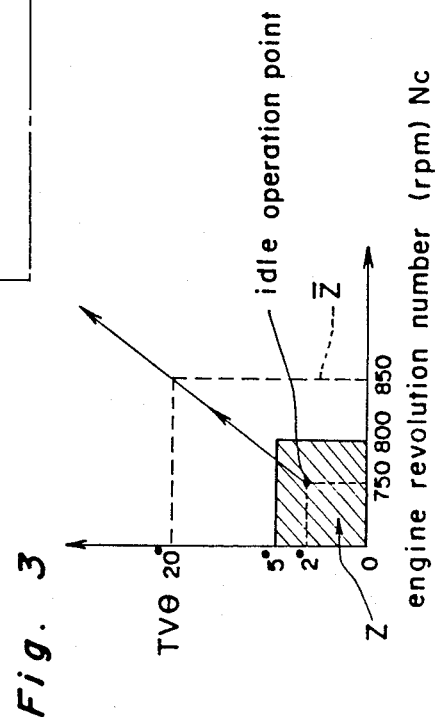
FIG. 3 is a graph showing the zone for doing the power mode increment to be employed in the apparatus of FIG. 1.

This low load zone Z is set as a low speed and low load zone based on a predetermined engine revolution number or lower and on a set opening or lower in the throttle opening as shown in FIG. 3. When the present operation condition is decided to be in the low load zone Z, the power-mode increment correction factor $C_{PW}$ is set at step #11.

When it has been decided that the zone is not the low load zone Z, the zone is confirmed to be the $\overline{Z}$ zone at step #10'. Thereafter, at step #12, the decision is made as to whether or not the zone $\overline{Z}$ occurs immediately after an escape from the low load zone Z. This decision may be made through the decision as to whether or not the previous decision has the low load zone Z. When the zone $\overline{Z}$ occurs immediately after an escape from the low load zone Z, the counting operation of the inner timer, that is, a timer determined by the program, which has the predetermined time, for example, of about two seconds, starts at step #13. When it is decided at step #14 that the running count of the timer has not yet reached the timer-set time, the power-mode increment correction Factor $C_{PW}$, (for example, about 0.15) is set at step #11 as in the case of the low load zone Z. If the $\overline{Z}$ zone does not occur immediately after an escape from the low load zone Z, the power mode increment is performed when the zone is not the $\overline{Z}$ zone or when the time of the timer in step #13 is within the set time. After the set time passes, the timer is reset at step #15 to release the power-mode increment.

Therefore, even when the zone has escaped from the low load zone Z, the power-mode increment continues during the set time from the escaped moment as described hereinabove. Thus two ranges of low load operation exist. A first low load range during which fuel enrichment is subject to a restricted condition (e.g., time limit) extends, for example, to a high rotation, high load side of operation. This first low load range occurs immediately after a transition out of the low load range Z. The low load range itself can therefore be characterized as a second range of low load operation during which air-fuel ratio enrichment is unrestricted. In other words, as shown with the imaginary dotted line $\overline{Z}$ in FIG. 3, (i.e., the region of revolution number Nc=850 rpm, TV$\theta$=20°), the zone for performing the power-mode increment is enlarged outside of the low load zone Z, (i.e., the region of revolution number Nc=800 rpm, TV$\theta$=5°). Thus, the engine output may be effectively improved even with respect to quick start or the like. FIG. 3 also depicts a location of the idle operation point within the low load zone Z.

At step #16, the correction factors, with exception of the power-mode increment correction factor, and including a hot correction factor $C_W$, an acceleration correction factor $C_{ACC}$, a battery correction term $C_{BAT}$, etc., are calculated. At step #17, the injection time T of the injector 11 is calculated by the following equation.

$$T = K \times Qa/Ne \times (1 + C_W + C_{ACC} + C_{PW} + \ldots) + C_{BAT}$$

It is to be noted that the feedback air-fuel ratio correction is released during the fuel increment, including the power-mode increment and the other increment.

And at step #18, the injector 11 is opened by the injector driving circuit during the fuel injection time T calculated at step #17 to effect one fuel jetting operation.

Figure 4:
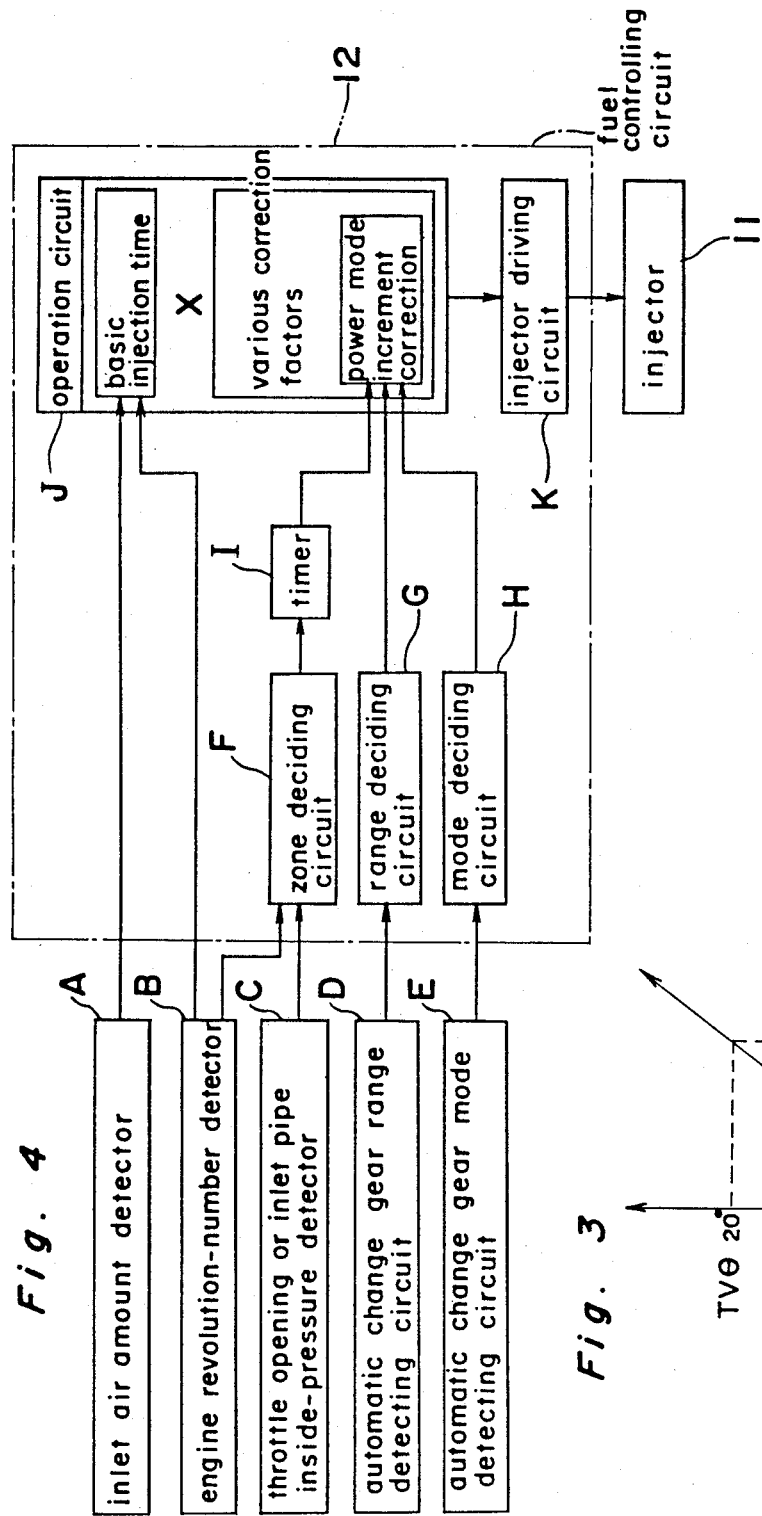
FIG. 4 is a block diagram of the fuel controlling circuit showing the function in relationship with the other circuits.

It is to be noted that the above-described system construction may function, for example, as shown in FIG. 4.

Namely, an inlet air-amount detector A, for example, air flow meter 14, an engine revolution-number detector B, a throttle opening detection means C, for example, throttle opening sensor 16, a range detection circuit D, for example, inhibit switch 17, of the automatic change gear and a mode detection circuit E of the automatic change gear are provided with respect to the fuel controlling circuit 12.

Also, the fuel controlling circuit 12 may be considered to be composed of a zone deciding circuit F for deciding from the engine revolution number Ne and the throttle opening TV$\theta$ whether or not the zone is the low load zone, a range deciding circuit G for deciding the range of the automatic change gear, a mode deciding circuit H for deciding the mode of the automatic change gear, an inner timer I for enlarging the zone which performs the power-mode increment, a calculating circuit J for calculating the various correction factors including the basic jetting time, the power-mode increment correction factor in accordance with the information of the various detection means A through E, the various deciding circuits F through H and the inner timer I, and finally for calculating the jetting time, and an injector driving circuit K for operating the injector 11 in accordance with the calculated jetting time.

Figure 5:
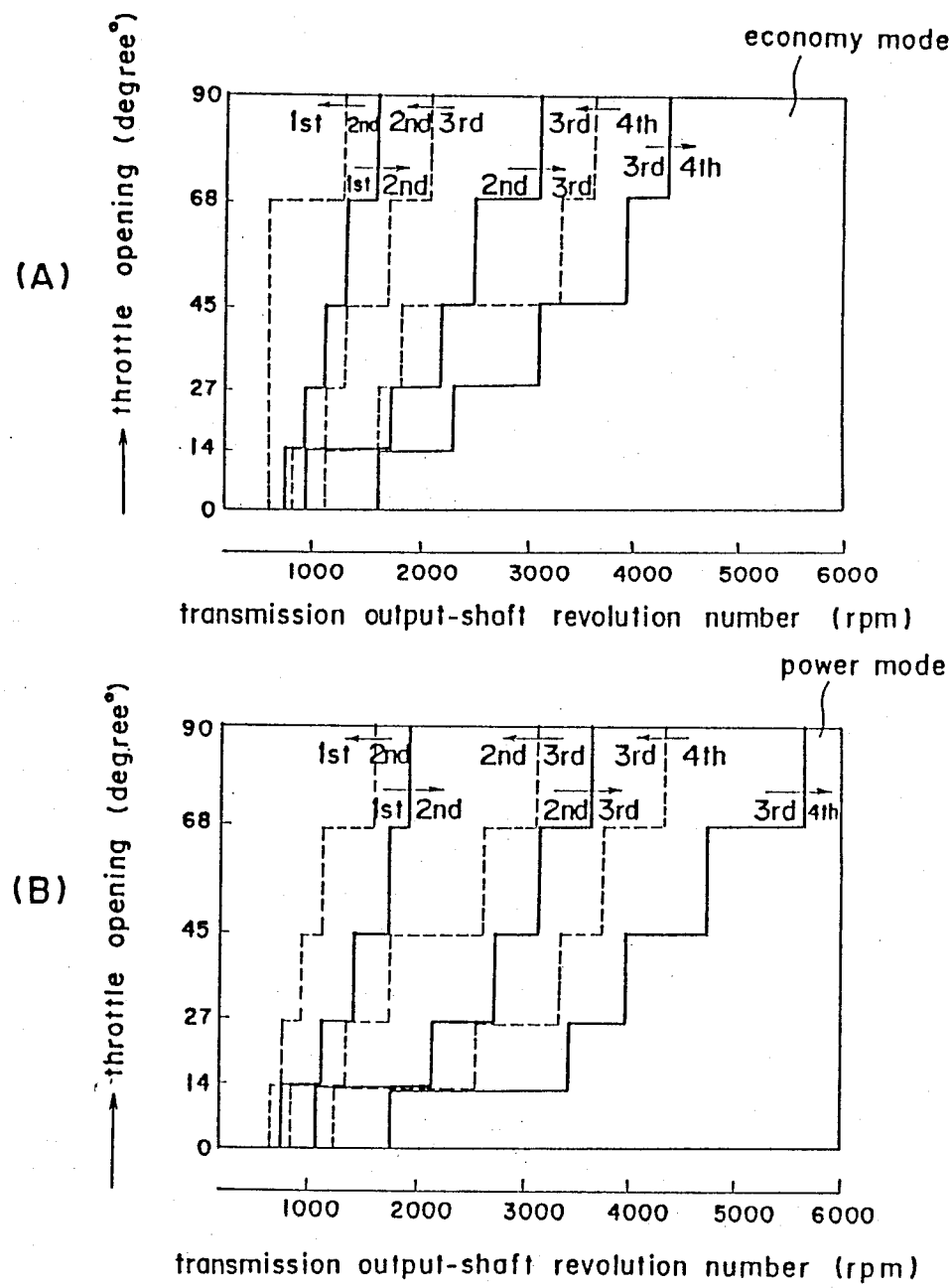
FIGS. 5(A) and 5(B) show respectively the relation between the transmission output shaft revolution number and the throttle opening in the economy mode and the power mode in the apparatus of FIG. 1.

Accordingly, in an engine provided with an automatic change gear which is adapted to be changed at a speed in accordance with the shift pattern of either the power-shift pattern with emphasis on the output, or the economy pattern with emphasis on fuel cost, the air-fuel ratio of the low load region is made richer when the power shift pattern is selected than when the economy shift pattern is selected. The relationship between the transmission output shaft revolution number (rpm) and the throttle opening (degree) in the economy mode and the power mode is shown in FIGS. 5(A) and 5(B).

Therefore, improvements in the start acceleration of the power-shift pattern and in the fuel cost of the economy-shift pattern may be compatible.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as being included therein.

What is claimed is:

1. In an air-fuel ratio controlling apparatus of an engine having an automatic change gear of an electronic control type, which may select either one of a power mode for controlling the gear ratio in accordance with a first shift pattern determined with emphasis on high engine power, or an economy mode for controlling the gear ratio in accordance with a second shift pattern determined with emphasis on low fuel consumption, the improvement thereof comprising:
   means for setting up and generating a shift change of the power mode different from a shift change of the economy mode;
   means for detecting an enrich area set within a given low load range;
   means for detecting selection of the power mode; and
   air-fuel ratio adjusting means for making the air-fuel ratio richer upon receiving a detecting signal from each of the detecting means during a running of the power mode in said enrich area set within the given low load range, whereby a mode difference between the power mode and the economy mode is generated on the basis of a difference in transmission operation and on the basis of a difference in the air-fuel ratio during the low load range.

2. The air-fuel ratio controlling apparatus defined in claim 1, wherein the air-fuel ratio adjusting means for making the air-fuel ratio rich during selection of the power mode continues for a given period of time to make the air-fuel ratio richer when shifting from a low load operation to a state of non-detection of the low load operation.

3. The air-fuel ratio controlling apparatus defined in claim 1, wherein the enrich area includes an idle operation state of the engine.

4. The air-fuel ratio controlling apparatus defined in claim 1, further comprising transmission position detecting means for detecting a shift position of the transmission to output a signal respresenting the shift position and means for prohibiting the air-fuel ratio adjusting means from enriching the air-fuel ratio when the signal outputted from the transmission position detecting means indicates that the transmission is in a neutral shift position.

5. In an air-fuel ratio controlling apparatus of an engine having an automatic change gear of an electronic control type, which may select either one of a power mode for controlling the gear ratio in accordance with a first shift pattern determined with emphasis on high engine power, or an economy mode for controlling the gear ratio in accordance with a second shift pattern determined with emphasis on low fuel consumption, the improvement thereof comprising:
   a low load operation detecting means for detecting operation in a low load range of the engine;
   a power mode detecting means for detecting selection of the power mode;
   an air-fuel ratio adjusting means which receives a detection signal from each of said detecting means to make the air-fuel ratio richer during the low load operation when the power-mode is selected than when the economy mode is selected; and, wherein said low load range is divided into a first low load range and a second low load range, the first low load range being set to extend to a high-rotation, high load side in comparison with the second low load range, such that the air-fuel ratio is enriched without limitation if operation resided in the second low load range, is enriched under a given restricted condition if operation existed in the first low load range after escaping from the second low load range, and is prohibited from being enriched at a state of driving after escaping from the first low load range.

6. The air-fuel ratio controlling apparatus defined in claim 5, wherein the given restricted condition is adapted to restrict enrichment for a given period of time.

7. The air-fuel ratio controlling apparatus defined in claim 6, wherein the given period of time is counted, starting from a time of moving to the first low load range after escaping from the second low load range.

8. In an air-fuel ratio controlling apparatus of an engine having an automatic change gear of an electronic control type, which may select either one of a power mode for controlling the gear ratio in accordance with a first shift pattern determined with emphasis on high engine power, or an economy mode for controlling the gear ratio in accordance with a second shift pattern determined with emphasis on low fuel consumption, the improvement thereof comprising:

means for setting up and generating a shift change of the power mode different from a shift change of the economy mode;

means for detecting an enrich area set within a given low load range;

means for detecting selection of the power mode;

air-fuel ratio adjusting means for making the air-fuel ratio richer upon receiving a detecting signal from each of the detecting means during a running of the power mode in said enrich area set within the given low load range, whereby a mode difference between the power mode and the economy mode is generated on the basis of a difference in transmission operation and on the basis of a difference in the air-fuel ratio during the low load range; and low load operation detecting means for detecting operation in a low load range of the engine, said air-fuel ratio adjusting means receiving said detection signal from said power mode detecting means and a detection signal from said low load operation detecting means to make the air-fuel ratio richer during the low load operation when the power-mode is selected than when the economy mode is selected, wherein said low load range is divided into a first low load range and a second low load range, the first low load range being set to extend to a high rotation, high load side in comparison with the second low load range, such that the air-fuel ratio is enriched without limitation if operation resided in the second low load range, is enriched under a given restricted condition if operation existed in the first low load range after escaping from the second low load range, and is prohibited from being enriched at a state of driving after escaping from the first low load range.

* * * * *